(12) United States Patent
Jeon et al.

(10) Patent No.: US 10,976,860 B2
(45) Date of Patent: Apr. 13, 2021

(54) ELECTRONIC DEVICE

(71) Applicant: LG ELECTRONICS INC., Seoul (KR)

(72) Inventors: Sangkuk Jeon, Seoul (KR); Mansoo Sin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 16/478,688

(22) PCT Filed: Jan. 18, 2017

(86) PCT No.: PCT/KR2017/000609
§ 371 (c)(1),
(2) Date: Jul. 17, 2019

(87) PCT Pub. No.: WO2018/135675
PCT Pub. Date: Jul. 26, 2018

(65) Prior Publication Data
US 2020/0050360 A1 Feb. 13, 2020

(51) Int. Cl.
*G06F 3/041* (2006.01)
*G06K 9/00* (2006.01)

(52) U.S. Cl.
CPC .... *G06F 3/041661* (2019.05); *G06F 3/04164* (2019.05); *G06K 9/0002* (2013.01)

(58) Field of Classification Search
CPC .................. G06K 9/0002; G06F 3/041661
See application file for complete search history.

(56) References Cited

U.S. PATENT DOCUMENTS

| | | | | |
|---|---|---|---|---|
| 10,338,731 B2* | 7/2019 | Song | ................... | G06K 9/0002 |
| 10,379,684 B2* | 8/2019 | Ahn | ................... | G06K 9/0002 |
| 10,579,175 B2* | 3/2020 | Seol | ................... | G06F 3/0412 |
| 10,613,677 B2* | 4/2020 | Cho | ................... | G06F 3/0445 |

(Continued)

FOREIGN PATENT DOCUMENTS

| | | | |
|---|---|---|---|
| KR | 10-2015-0123844 A | 11/2015 | |
| KR | 10-2016-0003272 A | 1/2016 | |

(Continued)

*Primary Examiner* — William Boddie
*Assistant Examiner* — Bipin Gyawali
(74) *Attorney, Agent, or Firm* — Birch, Stewart, Kolasch & Birch, LLP

(57) ABSTRACT

The present disclosure provides an electronic device comprising: a touch screen including a display region for outputting an image; a window arranged on the touch screen; and a control unit, wherein the touch screen includes a touch sensing layer which receives a touch input applied on the display region and receives a touch input with a first sensing resolution, and a fingerprint sensing unit, which overlaps a specific portion of the display region, is arranged between the window and the touch sensing layer, and senses a fingerprint with a second sensing resolution higher than the first sensing resolution when a finger touches the specific portion, and in order to receive a touch input on the basis of the touching of the finger with the specific portion, the control unit controls the fingerprint sensing unit on the basis of a specific control command such that the second sensing resolution of the specific portion is changed to the first sensing resolution.

17 Claims, 11 Drawing Sheets

(56) References Cited

U.S. PATENT DOCUMENTS

| | | | | |
|---|---|---|---|---|
| 10,627,955 B2* | 4/2020 | Ko | ............... | H01L 27/323 |
| 2014/0241595 A1* | 8/2014 | Bernstein | ............. | G06K 9/0002 |
| | | | | 382/124 |
| 2014/0333328 A1 | 11/2014 | Nelson et al. | | |
| 2017/0024597 A1* | 1/2017 | Cho | ............... | G06F 3/041 |
| 2017/0206393 A1* | 7/2017 | Chia | ............... | G06F 21/32 |
| 2019/0369799 A1* | 12/2019 | Jeon | ............... | G06F 3/0445 |
| 2020/0225789 A1* | 7/2020 | Akimoto | ............. | G06F 3/0446 |

FOREIGN PATENT DOCUMENTS

| | | |
|---|---|---|
| KR | 10-2016-0096390 A | 8/2016 |
| KR | 10-2016-0098030 A | 8/2016 |

\* cited by examiner

ELECTRONIC DEVICE

CROSS REFERENCE TO RELATED APPLICATIONS

This application is the National Phase of PCT International Application No. PCT/KR2017/000609, filed on Jan. 18, 2017, which is hereby expressly incorporated by reference into the present application.

TECHNICAL FIELD

The present disclosure relates to an electronic device and a method for controlling the same.

BACKGROUND ART

Terminals may be divided into glass-type terminals (mobile/portable terminals) and stationary terminals according to mobility. Also, the glass-type terminals may be classified into handheld types and vehicle mount types according to whether or not a user can directly carry.

The terminal has various functions according to development of technologies. For example, a mobile terminal can be allowed to capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

In recent years, biometric user authentication technologies have been developed. In particular, a fingerprint sensing device, which uses fingerprint data having unique biometric information of an individual as a user authentication method, has been applied to a mobile terminal. However, when a fingerprint sensor is disposed at one area of a touch sensor corresponding to a display unit, a touch input applied to the one area covered by the fingerprint sensor is not detected.

DISCLOSURE

Technical Problem

Therefore, one aspect of the present disclosure is to provide an electronic device in which a touch input on an entire area of a display unit area is detected when fingerprint sensing is available for one area of the display unit.

Technical Solution

In order to achieve the aspect and other advantages, there is provided an electronic device including a touch screen having a display area for displaying an image, a window disposed above the touch screen, and a controller. The touch screen may further include a touch sensing layer for receiving a touch input applied to the display area and receiving the touch input at a first sensing resolution, and a fingerprint sensing layer overlapping a specific area of the display area and disposed between the window and the touch sensing layer, and configured to sense a fingerprint at a second sensing resolution, which is higher than the first sensing resolution, when a finger is touched on the specific area. The controller may control the fingerprint sensing layer such that the second sensing resolution of the specific area is changed to the first sensing resolution in order to receive a touch input of a finger making contact with the specific area based on a specific control command.

In one embodiment, a second switch may connect first electrode lines overlapping with one area of one second sensing electrode line to a second circuit board so that the first electrode lines operate as a single sensing electrode line to receive a touch input together with a first sensing electrode line. Thus, grouped fingerprint second sensing electrode lines may be used as a sensing electrode line for detecting a touch input in case receiving a touch input.

In one embodiment, the fingerprint sensing layer may be disposed so as to overlap one area of the touch sensing layer. A cover glass that includes a connecting portion for transferring an electric field to the fingerprint sensing layer from the touch sensing layer may be further provided. The cover glass may be formed between the touch sensing layer and the fingerprint sensing layer. The connecting portion may include a plurality of holes formed in a thickness direction of the cover glass and having a light-transmissive conductive member filled therein. Therefore, a touch input can be sensed without an additional switch as the electric field of the touch sensing layer is transferred to electrode lines of the fingerprint sensing layer.

Advantageous Effects

According to the present disclosure, even when a fingerprint sensing layer is disposed to cover one area of a touch sensing layer that receives a touch input, a part of a fingerprint sensing layer constructs one sensing line of the touch sensing layer. Thus, a touch input on the one area can also be applied.

Therefore, a touch input can be applied to an entire area of a touch screen even when a touch sensing layer is disposed at one area of the touch screen.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
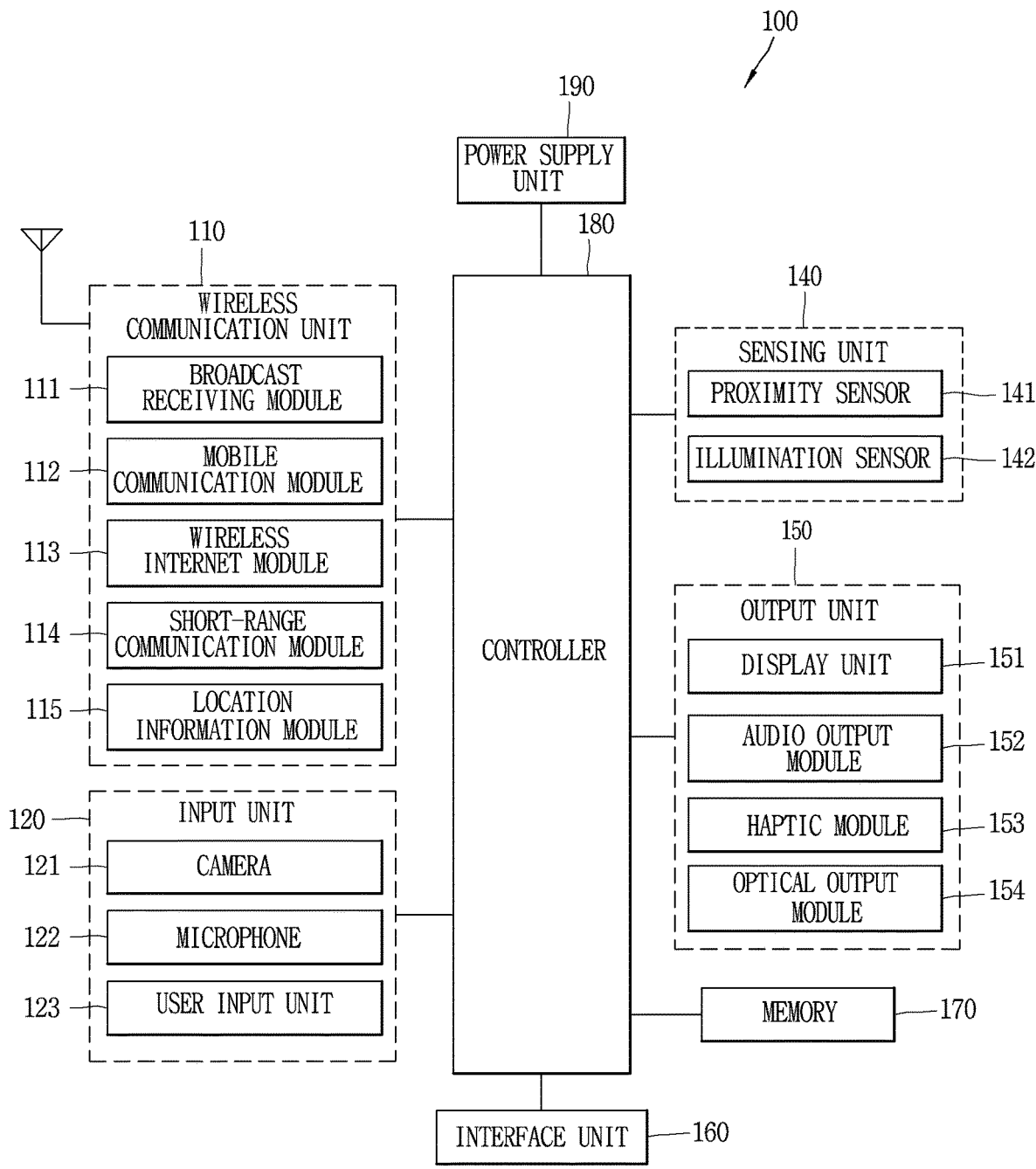
FIG. 1A is a block diagram of a mobile terminal in accordance with one exemplary embodiment of the present disclosure.

FIG. 1A is a block diagram of a mobile terminal 100 in accordance with one exemplary embodiment of the present disclosure.

The mobile terminal 100 may be shown having components such as a wireless communication unit 110, an input unit 120, a sensing unit 140, an output unit 150, an interface unit 160, a memory 170, a controller (control unit) 180, and a power supply unit 190. FIG. 1 shows the mobile terminal 100 having various components, but it may be understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal 100, the surrounding environment of the mobile terminal 100, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the wearable device 100, under the control of the controller 180. The power supply unit 190 may include a battery, and the battery may be configured as an embedded battery or a detachable battery.

At least part of the components may cooperatively operate to implement an operation, a control or a control method of the mobile terminal 100 according to various embodiments disclosed herein. Also, the operation, the control or the control method of the mobile terminal 100 may be implemented on electronic device by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneous reception of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another electronic device may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal 100. As an example, the location information module 115 includes a Global Position System (GPS) module, a Wi-Fi module, or both. For example, when the mobile terminal 100 uses a GPS module, a position of the mobile terminal 100 may be acquired using a signal sent from a GPS satellite. As another example, when the mobile terminal 100 uses the Wi-Fi module, a position of the mobile terminal 100 may be acquired based on information related to a wireless access point (AP) which transmits or receives a wireless signal to or from the Wi-Fi module. If desired, the location information module 115 may alternatively or additionally perform a function of any of the other modules of the wireless communication unit 110 to obtain data related to the position of the mobile terminal 100. The location information module 115 is a module used for acquiring the position (or the current position) of the mobile terminal 100, and may not be limited to a module for directly calculating or acquiring the position of the electronic device.

Next, the input unit 120 is for inputting image information (or signal), audio information (or signal), data, or information input from a user. For inputting image information, the mobile terminal 100 may be provided with a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 provided in the mobile terminal 100 may be arranged in a matrix configuration to permit a plurality of image information having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal 100, surrounding environment information of the mobile terminal 100, user information, or the like, and generates a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal 100 covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, the controller 180 may process data corresponding to proximity touches and proximity touch patterns sensed by the proximity sensor 141, and cause visual information corresponding to the processed data to be output on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the touch screen, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the object in vicinity of the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source of the mobile terminal 100. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal 100 emits monochromatic light or light with a plurality of colors to a front or rear surface. The signal output may be terminated as the mobile terminal 100 senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal 100 meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, description will be given of a structure of the mobile terminal 100 according to the one embodiment of the present disclosure illustrated in FIG. 1A or a terminal having those components, with reference to FIGS. 1B and 10.

Figure 1B:
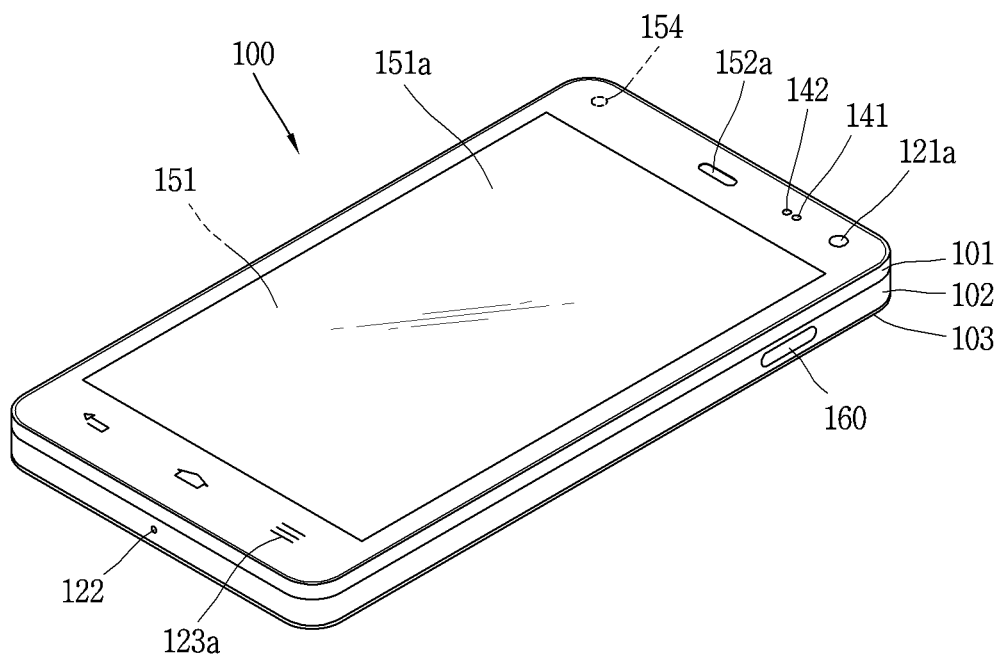
FIGS. 1B and 1C are views of a mobile terminal according to one embodiment of the present disclosure, viewed from different directions.
Figure 1C:
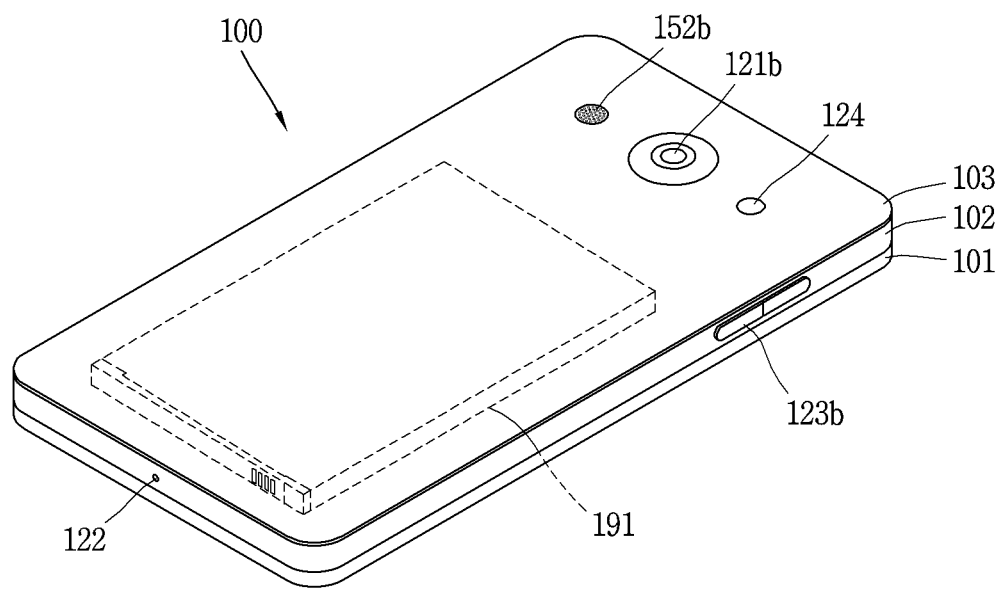

Referring to FIGS. 1B and 10, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally be applied to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 10, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be designated.

On the other hand, the touch sensor may be configured in a form of a film having a touch pattern and disposed between a window and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a. Hereinafter, for the sake of explanation, the display unit (display module) for outputting the image and the touch sensor are collectively referred to as a touch screen 151.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

An antenna according to the present disclosure includes an antenna pattern 110' formed in one area of the mobile terminal body 100. The antenna pattern 110' has a predetermined length to transmit and receive a radio signal in a predetermined frequency range. For example, the antenna pattern 110' according to one exemplary embodiment of the present disclosure may be formed at a lower end portion of the mobile terminal body 100. However, a placement position of the antenna pattern 110' is not limited thereto. For example, the antenna pattern 110' may be formed at one area of the rear cover 103, or on an inner frame that forms an inner structure of the mobile terminal body 100.

Window

FIGS. 2A to 2F are conceptual views illustrating a structure of a display module structure and a touch sensor according to various embodiments of the present disclosure.

Figure 2A:
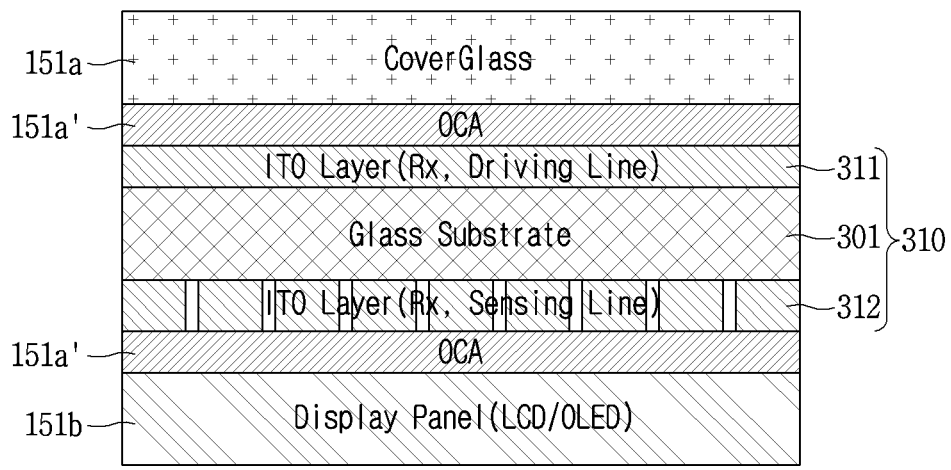
FIGS. 2A to 2F are conceptual views illustrating a structure of a display module and a touch sensor in accordance with various embodiments of the present disclosure.

A touch screen 151 according to FIG. 2A includes a window (cover glass) 151a, a display module 151b, and a touch sensor module 310. The touch sensor module 310 is formed on the display module 151b, and the window 151a is formed on the touch sensor module 310. An adhesive layer (OCA) 151a' is formed between the display module 151b and the touch sensor module 310, and between the window 151a and the touch sensor module 310, respectively.

The touch sensor module 310 is formed on both surfaces of a glass substrate 301, and includes first and second sensing layers 311, 312 which include a plurality of electrode lines intersecting with each other. The first and second sensing layers 311, 312 are formed with a Tx layer and an Rx layer, respectively.

The first and second sensing layers 311, 312 are insulated by the glass substrate 301. Capacitance is changed by a finger making contact with the window 151a, and a touch input is sensed through changes in the capacitance.

Figure 2B:
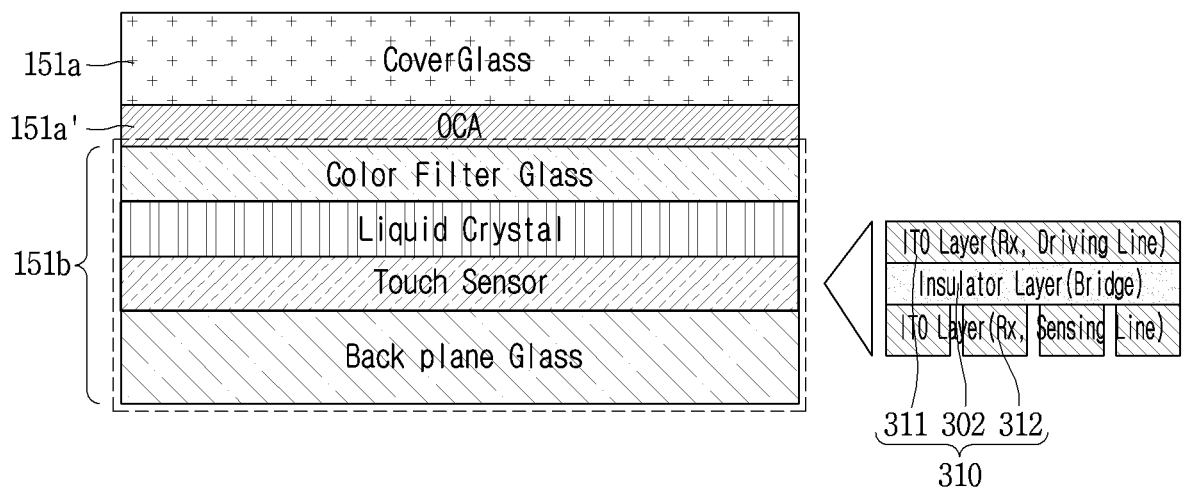

In the touch screen 151 according to FIG. 2B, the display module 151b is coupled below the window 151a by the adhesive layer 151a'. The display module 151b includes a backplane glass having a backlight, a liquid crystal layer, and a color filter layer. The touch sensor module 310 is formed on the backplane glass.

The first sensing layer 311 is formed on the backplane glass, and an insulator layer 302 is formed in contact with the first sensing layer 311. The second sensing layer 312 is formed on the insulator layer 302 and the backplane glass so as not to be in contact with the first sensing layer 311. Accordingly, the first and second sensing layers 311, 312 may be formed on the backplane glass in an insulated state from each other by the insulator layer 302.

Figure 2C:
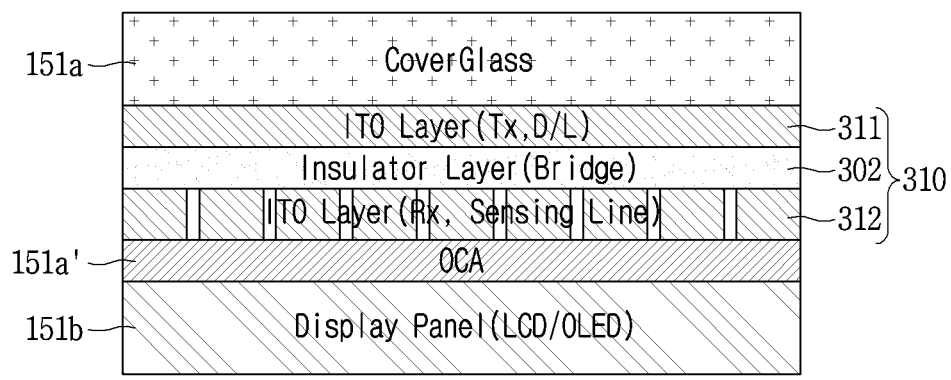

Referring to FIG. 2C, the first and second sensing layers 311, 312 are formed in contact with the window 151a. For example, the first sensing layer 311 is formed in an inner surface of the window 151a, and the insulator layer 302 is formed in contact with the first sensing layer 311. The second sensing layer 312 is formed on the insulator layer 302 and the window 151a so as not to be in contact with the first sensing layer 311.

The display module 151b is mounted below the window 151a formed integrally with the touch sensor module 310.

According to these embodiments, the first and second sensing layers, which need to be insulated from each other, are formed on one glass substrate (window or backplane glass), thereby reducing a thickness of a touch screen.

Figure 2D:
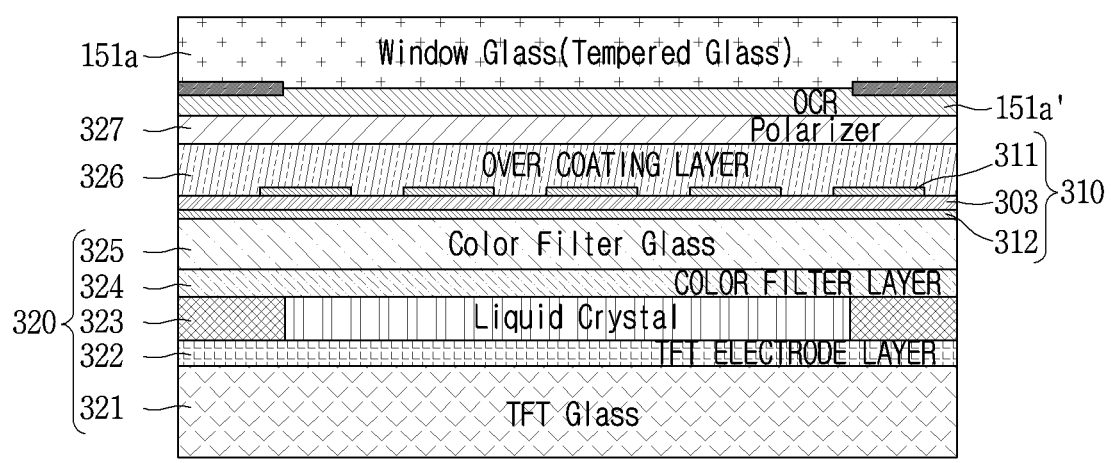

Referring to FIG. 2D, an insulator layer 303, a first sensing layer 311, and a second sensing layers 312 constituting the touch sensor module 310 may be disposed between each component of the display module 320.

The display module 320 includes a TFT electrode layer 322 formed on one surface of a TFT glass 321, a color filter layer 324 formed on one surface of a color filter glass 325, a liquid crystal layer 323 disposed between the color filter layer 324 and the TFT electrode layer 322, and a polarizer 327 disposed on the color filter glass 325. The polarizer 327 is attached by a transparent adhesive layer (OCA) 151*a*′.

The TFT electrode layer 322 is formed on the TFT glass 321, and the color filter layer 324 is formed on the color filter glass 325. The liquid crystal layer 323 is disposed between the color filter layer 323 and the TFT electrode layer 322.

The second sensing layer 312 is formed on the color filter glass 325, and an insulator layer 303 is disposed on the second sensing layer 312. The first sensing layer 311 is formed on the insulator layer 303.

A coating layer 326 is formed on the first sensing layer 311 and a polarizer 327 attached to the window (cover glass) 151*a* is formed on the coating layer 326.

In other words, since the first and second sensing layers 311, 312 are formed on the color filter glass 325, which is used for a base substrate among the components of the display module 151*b*, no additional configuration is required, thereby reducing a thickness of a display module.

Figure 2E:
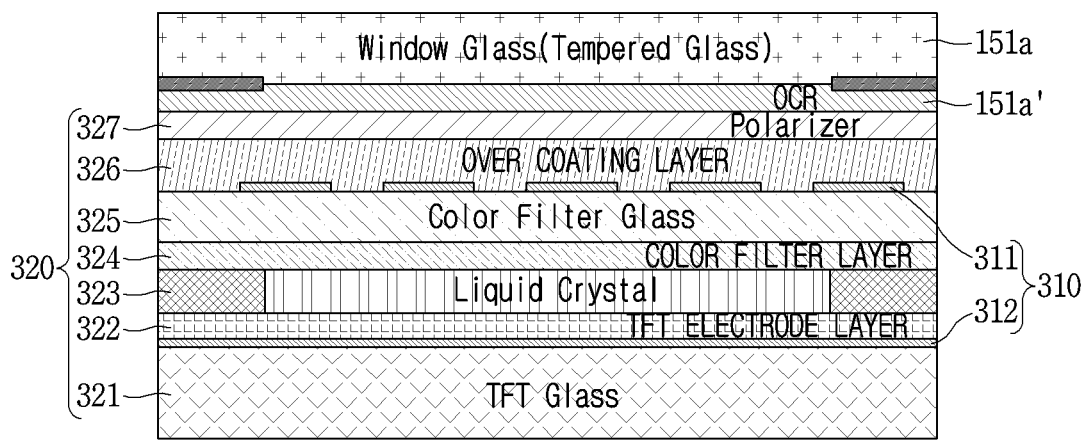

Referring to FIG. 2E, the display module 320 includes the TFT electrode layer 322 formed on one surface of the TFT glass 321, the color filter layer 324 formed on one surface of the color filter glass 325, the liquid crystal layer 323 disposed between the color filter layer 324 and the TFT electrode layer 322, and the polarizer 327 disposed on the color filter glass 325. The polarizer 327 is attached by the transparent adhesive layer 151*a*′.

The first sensing layer 311 is formed on the color filter glass 325, and the coating layer 326 is formed on one surface on which the first sensing layer 311 is formed. The second sensing layer 312 is formed on the TFT glass 321.

Figure 2F:
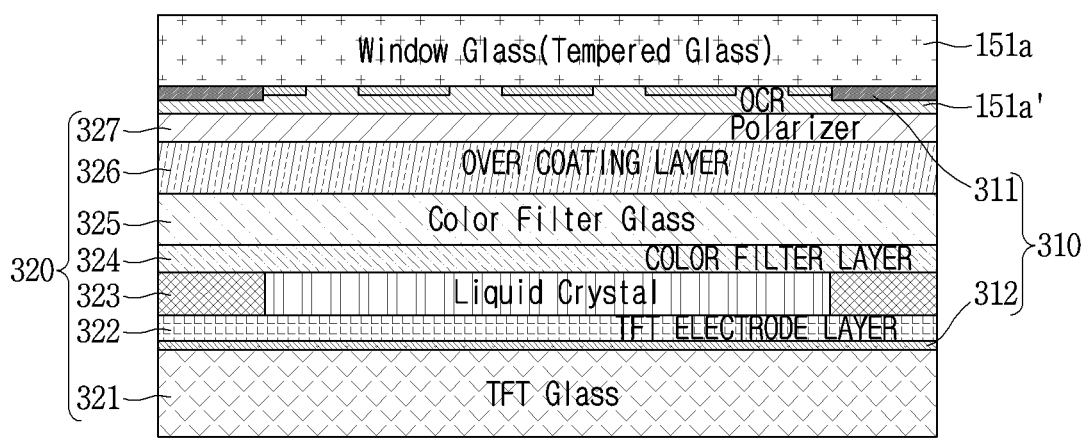

Referring to FIG. 2F, the second sensing layer 312 is formed on the TFT glass 321, but the first sensing layer 311 is formed on one surface on which the polarizer 327 of the window 151*a* is formed.

In other words, according to the embodiments, the first and second sensing layers included in the touch sensor module (or touch sensing layer) 310 may be disposed at different areas of the display module and the window.

According to the present disclosure, a fingerprint sensing layer (or unit) is formed so as to cover a part of the touch sensing layer based on one of the various embodiments illustrated in FIGS. 2A to 2F, and a touch input is received or fingerprint information is acquired when a finger touch is applied to the window. However, when a finger touches an area where the fingerprint sensing layer is formed, not only the fingerprint information but also the touch input can be received. Hereinafter, features of the present disclosure will be described in detail.

Figure 3A:
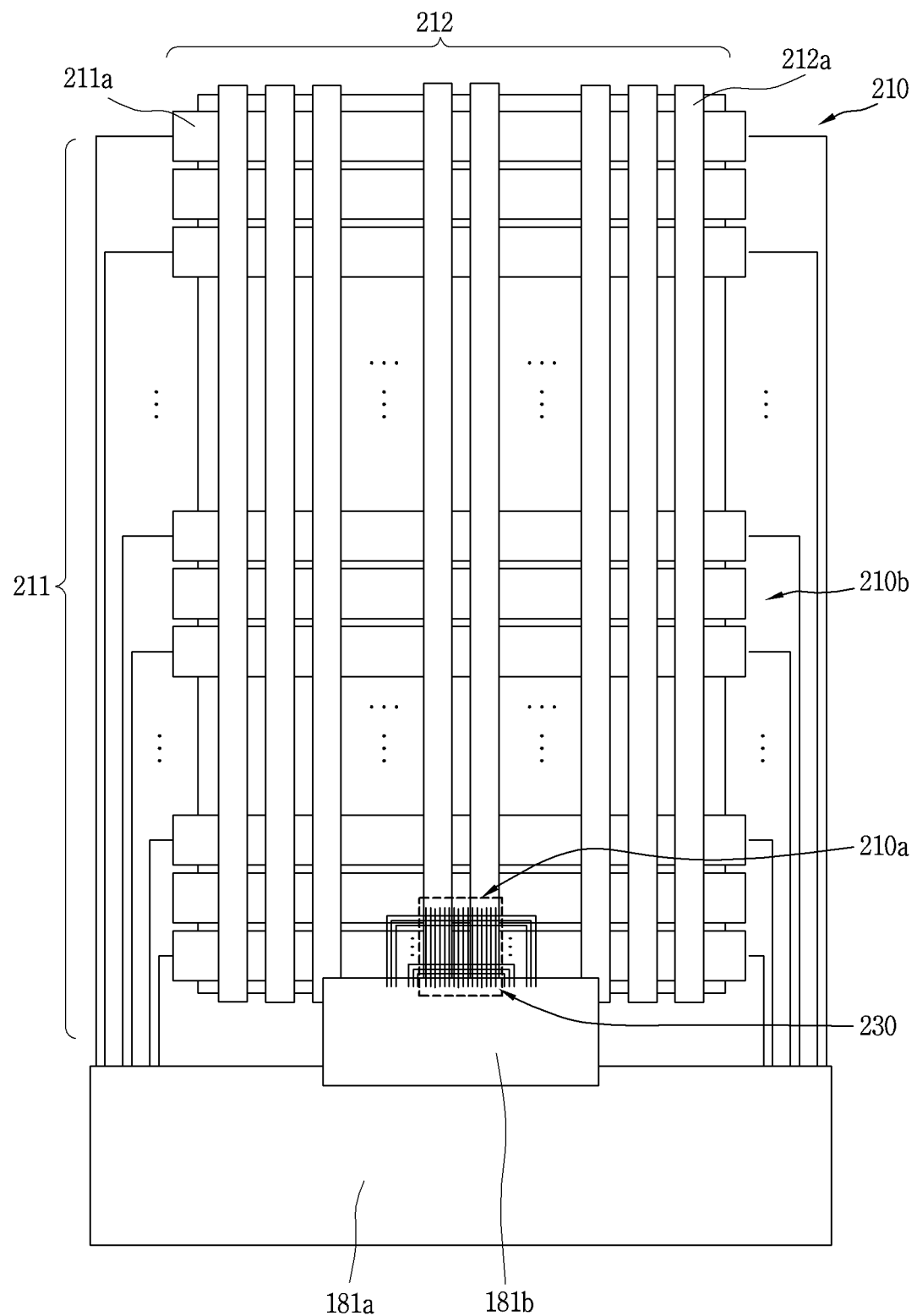
FIG. 3A is a conceptual view illustrating an arrangement structure of a touch sensing layer and a fingerprint sensing layer.

FIG. 3A is a conceptual view illustrating an arrangement structure of a touch sensing layer and a fingerprint sensing layer.

A touch sensing layer and a fingerprint sensing layer according to the present disclosure are disposed to correspond to an image display area of the touch screen (151).

Referring to FIG. 3A, a touch sensing layer 210 includes a first sensing (electrode) line section 211 and a second sensing (electrode) line section 212. The first sensing line section 211 includes a plurality of first sensing lines 211*a* extending in one direction. The second sensing line section 212 includes a plurality of second sensing lines 212*a* extending in a direction intersecting the one direction.

The first and second sensing lines 211*a*, 212*a* are arranged to intersect each other in an insulated state so as to sense a change of capacitance caused by a touch input on the window 151*a*. Here, the first sensing line 211*a* corresponds to a Tx electrode line, and the second sensing line 212*a* corresponds to a Rx electrode line.

The fingerprint sensing layer 230 is disposed in a way to overlap a first area (or region) 210*a*, which is a specific area of the touch sensing layer 210. As the fingerprint sensing layer 230 partially overlaps the touch sensing layer 210, fingerprint information may only be obtained in the specific area of the touch screen 151. The remaining area of the touch sensing layer 210, except for the first area 210*a*, is defined as a second area 210*b*. The second area 210*b* may sense a touch input but may not acquire fingerprint information. However, according to the present disclosure, the first area 210*a* may acquire the fingerprint information or sense a touch input.

The touch sensing layer 210 senses a touch input at a first sensing resolution, and the fingerprint sensing layer 230 senses fingerprint information at a second sensing resolution, which is higher than the first sensing resolution.

Figure 3B:
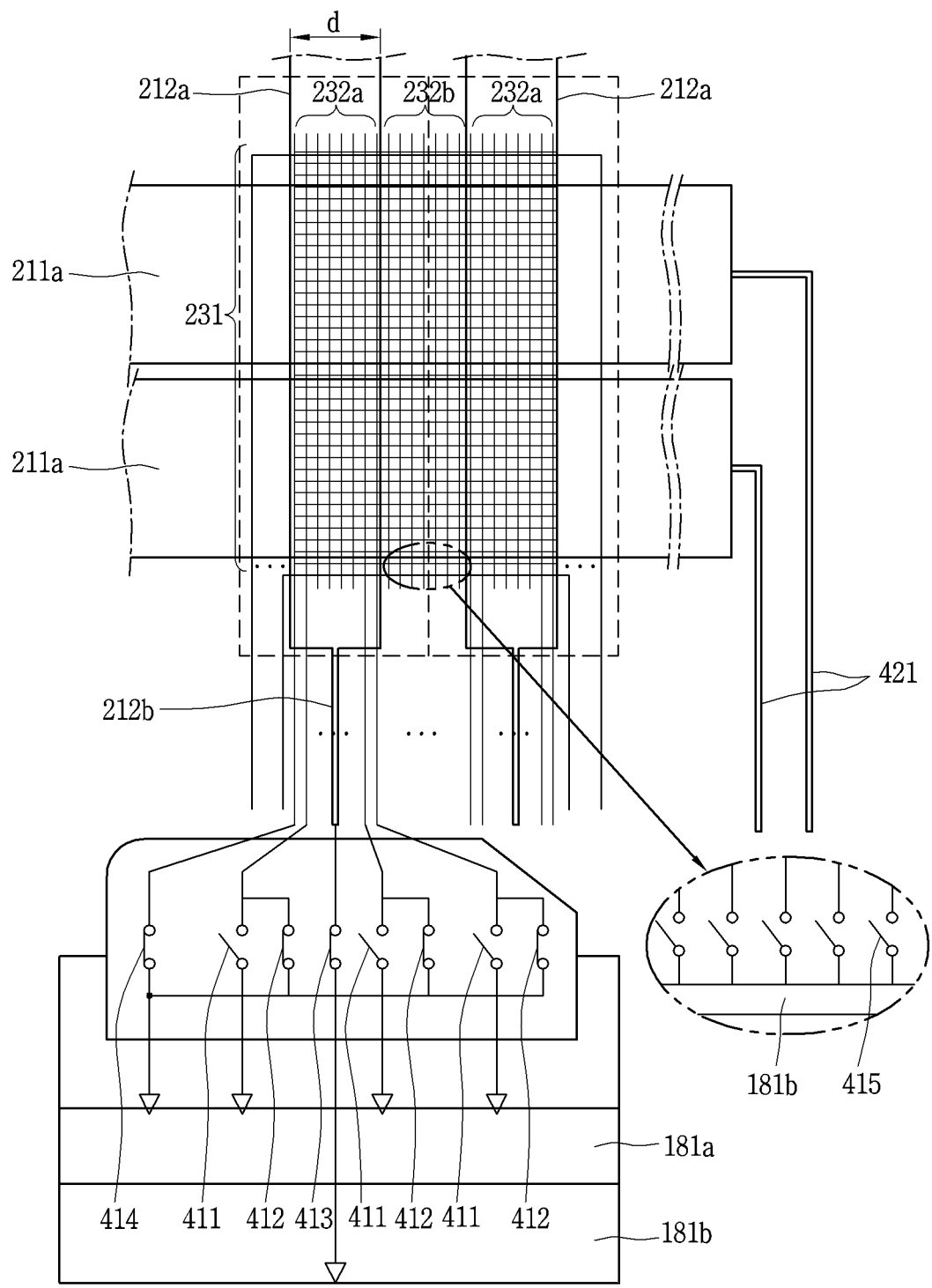
FIGS. 3B and 3C are conceptual views illustrating a driving state of a switch unit for sensing a touch input applied on a window in a touch sensing mode.
Figure 3C:
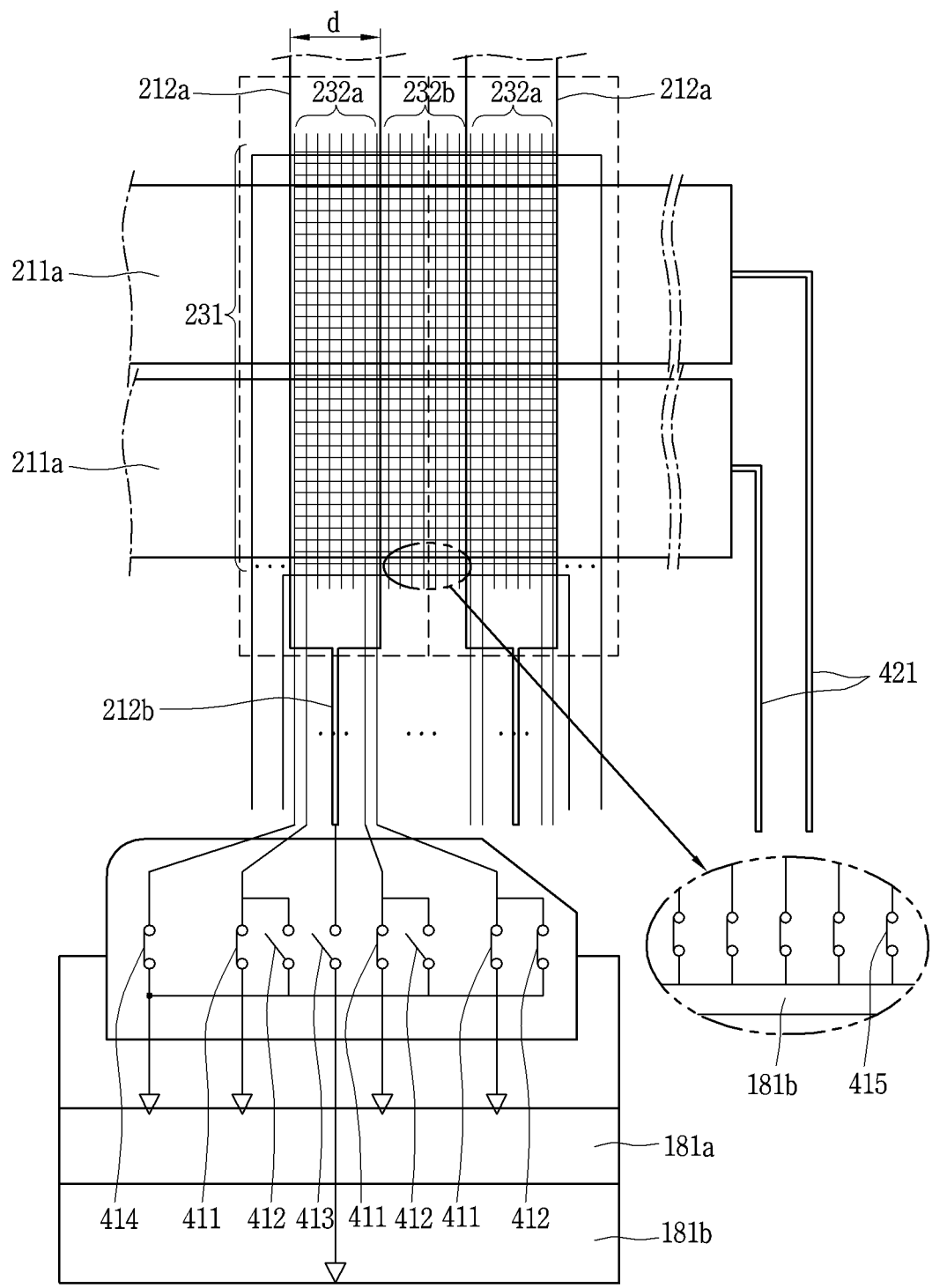

Referring to FIGS. 3B and 3C, the fingerprint sensing layer 230 includes a first fingerprint sensing layer 231 having a plurality of first fingerprint sensing (electrode) lines extending in the one direction, and a second fingerprint sensing layer 232 having a plurality of second fingerprint sensing (electrode) lines extending in a direction intersecting the one direction. A thickness of the first and second fingerprint sensing lines is smaller than a thickness d of the first and second sensing lines 211*a*, 212*b*. That is, the first and second fingerprint sensing lines are arranged to be insulated from each other so as to detect changes in capacitance.

Since the first and second fingerprint sensing lines are densely arranged, a sensing resolution of the fingerprint sensing layer 230 is higher than a sensing resolution of the touch sensing layer 210, which allows fingerprint information to be acquired.

In addition, part of the first and second fingerprint sensing lines overlaps the first and second sensing lines 211*a*, 212*a* of the first area 210*a*. First (electrode) lines 232*a* of the plurality of second fingerprint sensing lines overlap the second sensing line section 212, and second (electrode) lines 232*b* of the second fingerprint sensing lines do not overlap the second sensing line section 212.

The controller 180 may selectively activate a touch sensing mode for receiving the touch input or a fingerprint sensing mode for acquiring fingerprint information using the touch sensing layer 210 and the fingerprint sensing layer 230. The first lines 232*a* of the second fingerprint sensing lines that are included in the fingerprint sensing layer 230 and overlapping the second sensing lines 212*a* are grouped to operate as a single sensing line in the fingerprint sensing mode. Also, in the fingerprint sensing mode, the second lines 232*b* of the second fingerprint sensing lines are disconnected from a circuit board in order to prevent current flowing or current sensing.

A fingerprint sensing module further includes a switch unit for connecting the fingerprint sensing layer 230 to the circuit board. The switch unit includes a plurality of switches connected to each of the first lines 232*a*.

Part of the first lines 232*a* is selectively connected to first and second switches 411, 412. The remaining first lines 232*a* are connected to a fourth switch 414. Meanwhile, the second sensing lines 212*a* of the first area 210*a* overlapping the first lines 232*a* are connected to the circuit board by a third switch 413.

FIG. 3B is a conceptual view illustrating a driving state of a switch unit for sensing a touch input on the window 151*a* in the touch sensing mode. In the touch sensing mode, the first lines 232*a* are connected to the second switch 412. The second switch 412 overlaps one second sensing line 212*a*, and a plurality of first lines 232*a* connected to the second switch 412 is implemented as a single sensing line. The plurality of first lines 232*a* implemented as the single sensing line is connected to a second circuit board 181*b* to sense a signal.

The plurality of first lines connected to the second switch 412 and the second sensing line 212*a* are connected together, so as to implement as a single sensing line. The plurality of first lines implemented as the single sensing line detects a change in capacitance together with the first sensing line 211*a*.

Each of the second lines 232*b* is connected to a fifth switch 415. The second lines 232*b* are connected to a first circuit board 181*a* that senses fingerprint information. In the touch sensing mode, the fifth switch 415 disconnects the first circuit board 181*a* from the second lines 232*b*. Accordingly, the second lines 232*b* serve as dummy (electrode) lines that do not transmit or receive a signal.

FIG. 3C is a conceptual view illustrating a driving state of a switch unit for acquiring fingerprint information of a finger making contact with the specific area of the window 151*a* in the fingerprint sensing mode. In the fingerprint sensing mode, the first lines 232*a* are connected to the first circuit board 181*a* by the first switch 411. Each of the first lines 232*a* is connected to the first circuit board 181*a* to sense a change in capacitance together with the second lines 232*b*, so that the fingerprint information is acquired.

In the fingerprint sensing mode, the controller 180 may deactivate the first sensing line section 211 and the second sensing line section 212 of the touch sensing layer 210. Or at least part of the first and second sensing lines 211*a*, 212*a* overlapping the fingerprint sensing layer 230 may be deactivated. In this case, a touch input applied to one area of the touch screen 151 may be detected.

According to the present disclosure, when the touch sensing layer and the fingerprint sensing layer are disposed in an overlapping manner, electrode lines included in the fingerprint sensing layer are grouped according to whether the mode is the touch sensing mode or the fingerprint sensing mode so as to sense a touch input. Accordingly, a user can apply a touch input to one area where the fingerprint sensing layer is disposed.

Figure 4A:
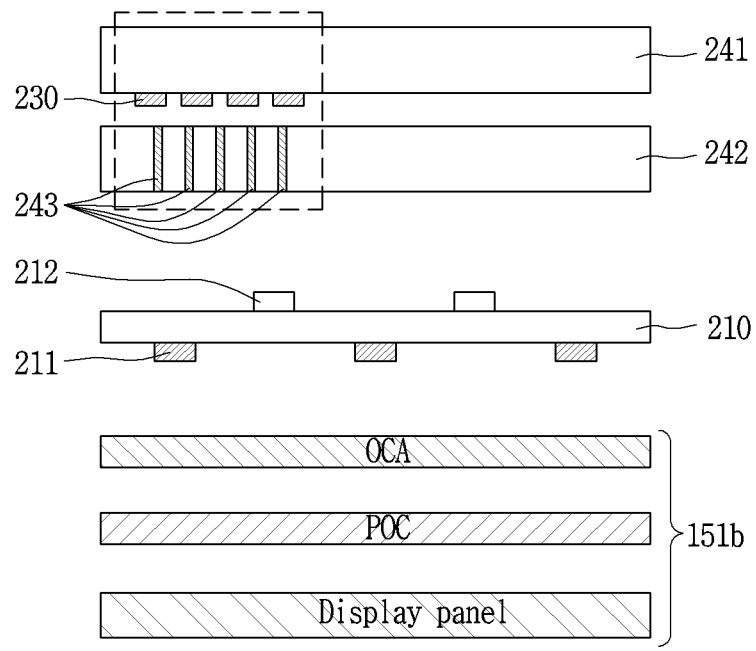
FIGS. 4A and 4B are conceptual views illustrating a structure of a touch sensing layer and a fingerprint sensing layer in accordance with another embodiment of the present disclosure.
Figure 4B:
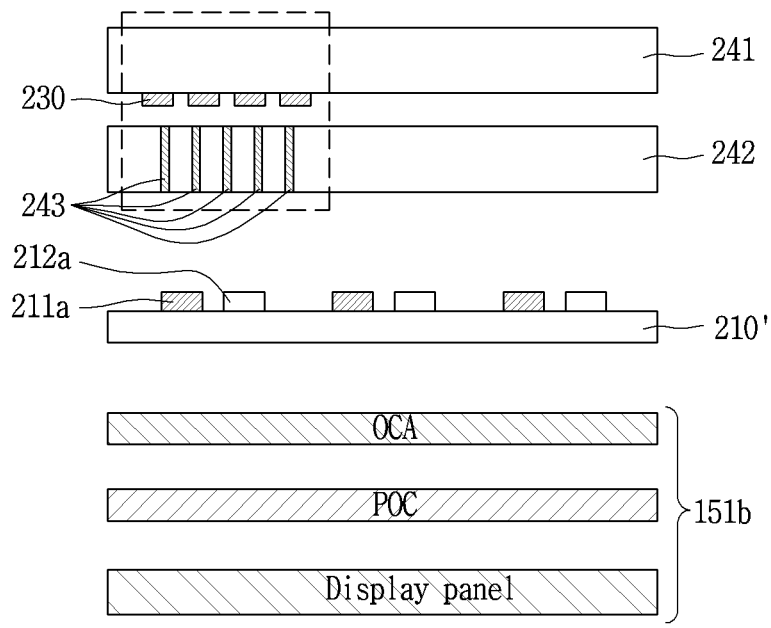

FIGS. 4A and 4B are conceptual views illustrating a structure of a touch sensing layer and a fingerprint sensing layer in accordance with another embodiment of the present disclosure.

Referring to FIG. 4A, the display module 151*b* includes a display panel, a polarizer, and an adhesive layer. The touch sensing layer 210 is attached to the adhesive layer. The touch sensing layer 210 includes first and second sensing line sections 211, 212. The first and second sensing line sections 211, 212 may be formed on both (upper and lower) surfaces of a glass substrate, respectively.

Referring to FIG. 4B, first and second sensing lines 211*a*, 212*a* of the first and second sensing line sections 211, 212 included in a touch sensing layer 210' may be formed on one surface of a glass substrate in an insulated state from each other. Although not specifically illustrated in the drawing, the touch sensing layer 210' is electrically connected to a touch circuit board.

Meanwhile, the fingerprint sensing layer 230 is formed above the touch sensing layer 210 or 210'. The fingerprint sensing layer 230 is formed in contact with one surface of a first cover glass 241. The one surface of the first cover glass 241 corresponds to a surface facing the touch sensing layer 210 or 210'. The fingerprint sensing layer 230 is formed in contact with one area of the first cover glass 241, and the fingerprint sensing layer 230 is overlapped with one area of the touch sensing layer 210 or 210'.

A second cover glass 242 is disposed between the touch sensing layer 210 or 210' and the fingerprint sensing layer 230. The second cover glass 242 has a connecting portion 243 formed on one area corresponding to the fingerprint sensing layer 230. The connecting portion 243 is provided with a plurality of holes formed in a thickness direction of the second cover glass 242, and a light-transmissive (or transparent) conductive material is filled in each of the plurality of holes. The connecting portion 243, among the plurality of intersecting lines of the fingerprint sensing layer 230, is disposed in an area corresponding to a (electrode) line arranged parallel to a direction to which an Rx electrode line is extended in the touch sensing layer 210 or 210'.

When a touch input is applied to the one area overlapping with the fingerprint sensing layer 230, an electric field generated in the touch sensing layer 210 or 210' is transmitted to the fingerprint sensing layer 230 so that the touch input is detected by the connecting portion 243.

In the touch sensing mode, the controller 180 disconnects the first and second sensing line sections of the fingerprint sensing layer 230 from the fingerprint circuit board. Accordingly, the first and second sensing line sections of the fingerprint sensing layer 230 may be utilized as a sensing line of the touch sensing layer.

Figure 5:
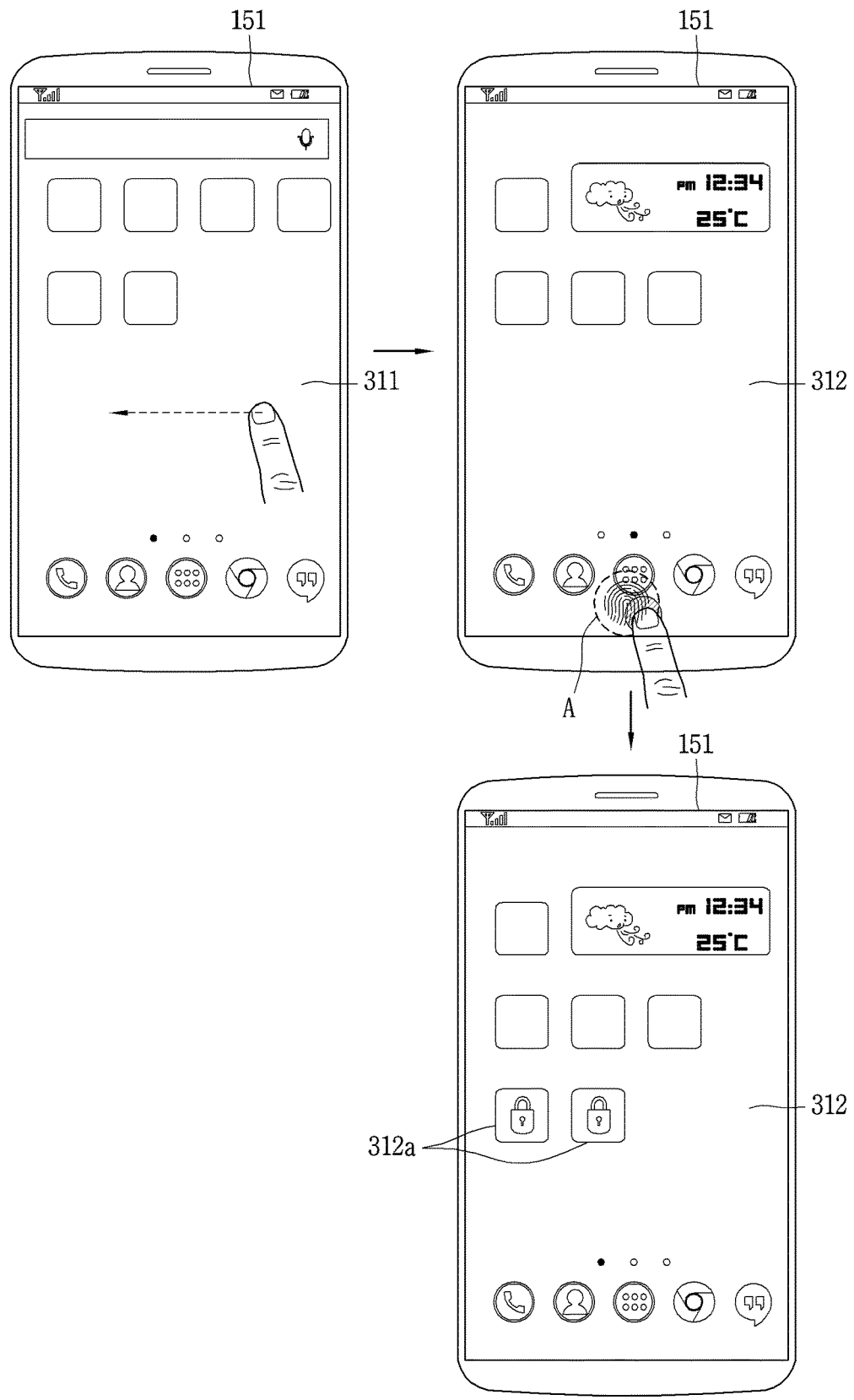
FIGS. 5 and 6 are conceptual views illustrating a method of controlling a mobile terminal in a touch sensing mode and a fingerprint sensing mode in accordance with one embodiment of the present disclosure.
Figure 6:
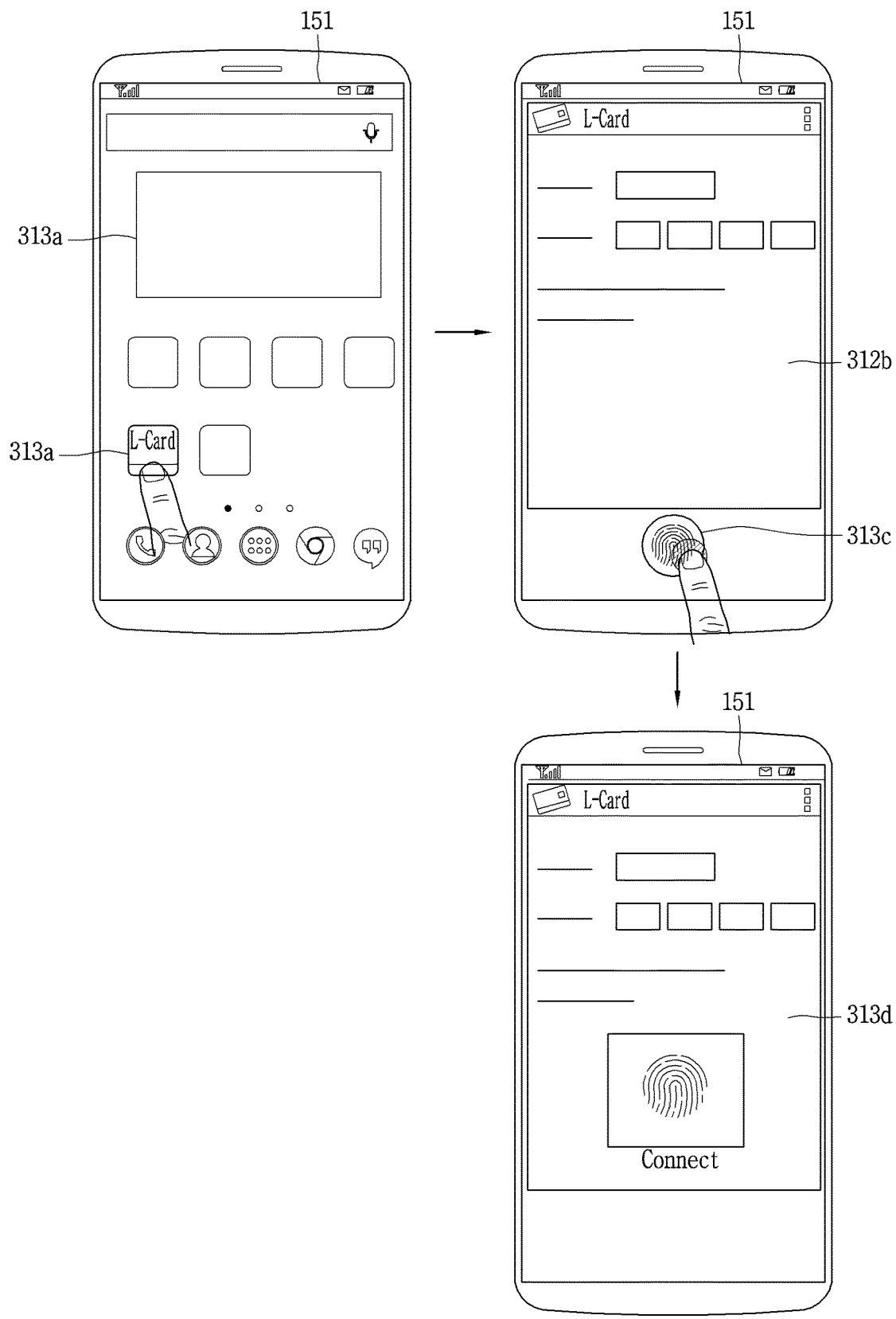

FIGS. 5 and 6 are conceptual views illustrating a control method of an electronic device in the touch sensing mode and the fingerprint sensing mode, in accordance with one embodiment of the present disclosure.

Referring to FIG. 5, the touch screen 151 displays first screen information 311 including a plurality of icons. When a touch input is applied to one area of the first screen information 311, the controller 180 executes a function based on the touch input in the touch sensing mode.

For example, the controller 180 controls the touch screen such that the first screen information 311 is changed to second screen information 312 based on a touch input applied to one area of the first screen information 311. The second screen information 312 may correspond to a home screen page including another icons.

The controller 180 switches the touch sensing mode to the fingerprint sensing mode when a touch is applied to a specific area A of the touch screen 151. In more detail, the controller 180 receives a touch input at the first sensing resolution when the touch is applied to the specific area A in the touch sensing mode. When switched to the fingerprint sensing mode, a sensing resolution of the specific area A is changed to the second sensing resolution. That is, the fingerprint sensing layer 230 having the second sensing resolution is activated.

Referring back to FIG. 3C, the controller 180 controls such that the first lines 232*a* are connected to the first circuit board 181*a* by the first switch 411. The second switch 412 is disconnected. The fingerprint sensing layer 230 acquires fingerprint information of a finger making contact with the specific area A.

The controller 180 may perform a user authentication procedure based on the fingerprint information. For example, the controller 180 may compare the obtained fingerprint information with prestored fingerprint information to perform the authentication procedure.

When the authentication procedure is successfully completed, the controller 180 controls the touch screen 151 to display a hidden icon 312a, which is locked, on the second screen information 312. Although not specifically illustrated in the drawing, the controller 180 may execute an application corresponding to the hidden icon 312a based on a touch applied to the hidden icon 312a.

According to this embodiment, when a user's touch is applied to a preset specific area A, the touch sensing mode is switched to the fingerprint sensing mode so as to acquire fingerprint information for executing a specific function (displaying a hidden icon). The specific function may be set based on an application executed when switching to the fingerprint sensing mode or screen information displayed on the touch screen 151.

Referring to FIG. 6, the touch screen 151 displays third screen information 313. The third screen information 313 may include an icon 313a for executing an application.

The controller 180 detects a touch input applied to the icon 313a in the touch sensing mode, and displays an application corresponding to the icon 313a.

The touch screen 151 displays an execution screen 313b of the application. When a user authentication procedure is required to execute a function of the application, the controller 180 switches the touch sensing mode to the fingerprint sensing mode while the execution screen 313b is being displayed.

When switched to the fingerprint sensing mode, a guide image 313c may be displayed on one area of the touch screen 151 where the fingerprint sensing layer 230 (See FIG. 3B) is disposed. The controller 180 acquires fingerprint information of the finger making contact with the guide image 313c. In this case, the controller 180 deactivates the touch sensing layer 210. For example, the controller 180 may be controlled such that a plurality of sensing lines included in the touch sensing layer 210 is disconnected from the circuit board.

When the user authentication is successfully completed using the acquired fingerprint information, the controller controls the touch screen to display a completion screen 313d that indicates the function is executed. According to this embodiment, a touch input can be applied to any area on the touch screen. When an application requiring user authentication is executed, the mode is switched to the fingerprint sensing mode based on this. Thus, a finger making contact with the touch screen can be detected without an additional control command.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL AVAILABILITY

Embodiments of the present disclosure provide an electronic device employing a touch sensing layer for sensing a touch input that can acquire fingerprint information. Therefore, these embodiments may be applied to various relevant industrial fields.

The invention claimed is:
1. An electronic device, comprising:
a window;
a display module;
a fingerprint sensing layer disposed at a lower part of the window;
a touch sensing layer having a specific area disposed between the fingerprint sensing layer and the display module, and a remaining area disposed between the window and the display module;
a first circuit board configured to process fingerprint information sensed by the fingerprint sensing layer;
a second circuit board configured to process a touch input sensed by the touch sensing layer and the fingerprint sensing layer;
a first switch configured to connect sensing electrode lines provided in the fingerprint sensing layer to the first circuit board;
a second switch configured to connect sensing electrode lines provided in the fingerprint sensing layer to the second circuit board;
a fourth switch configured to connect sensing electrode lines provided in the fingerprint sensing layer to the second circuit board; and
a controller configured to turn the second switch on in order to receive the touch input applied to the window and turn the first switch off in a touch sensing mode, and configured to turn the first switch on and turn the second switch off in a fingerprint sensing mode,
wherein the fingerprint sensing layer has first lines that overlap in the same direction one of lines of the touch sensing layer, and second lines that do not overlap the one of lines of the touch sensing layer,
wherein the first switch and the second switch are configured to connect the first lines,
wherein the touch input is sensed based on a touch applied to the specific area in the touch sensing mode, and
wherein one end of the second switch is connected to a branched line from the fourth switch so the first lines are grouped to operate as a single sensing line in the touch sensing mode.

2. The electronic device of claim 1, further comprising a third switch configured to connect part of the first lines of the fingerprint sensing layer to the second circuit board,
wherein the controller controls the third switch such that the first lines of the fingerprint sensing layer are disconnected from the second circuit board while the fingerprint information is being acquired.

3. The electronic device of claim 1, wherein the sensing electrode lines connected to the first and second switches correspond to Rx electrode lines.

4. An electronic device, comprising:
a window;
a display module;
a fingerprint sensing layer disposed at a lower part of the window;
a touch sensing layer having a specific area disposed between the fingerprint sensing layer and the display module, and a remaining area disposed between the window and the display module;
a first circuit board connected to the fingerprint sensing layer to process fingerprint information;
a second circuit board connected to the touch sensing layer to process a touch input; and
a controller,
wherein the touch sensing layer includes a plurality of Rx electrode lines and a plurality of Tx electrode lines,
wherein the fingerprint sensing layer includes a plurality of Tx electrode lines and a plurality of Rx electrode lines,
wherein the plurality of Rx electrode lines of the fingerprint sensing layer includes first Rx electrode lines overlapping part of the plurality of Rx electrode lines of the touch sensing layer, and second Rx electrode lines which are remaining electrode lines of the plurality of Rx electrode lines,
wherein each of the plurality of Rx electrode lines of the fingerprint sensing layer further includes a switch unit so as to be connected to the first circuit board, and
wherein the switch unit includes:
a first switch configured to connect a corresponding first Rx electrode line to the first circuit board;
a second switch having one end connected to the corresponding first Rx electrode line; and
a fourth switch configured to connect another first Rx electrode line that is not connected to the first and second switches, to the first circuit board,
wherein one end of the second switch is connected to a branched line from the fourth switch, and
wherein the controller controls the switch unit such that the first Rx electrode lines are grouped to operate as a single sensing line, by disconnecting the first Rx electrode lines from the first switch and connecting the first Rx electrode lines to the second switch, while the touch input is being sensed.

5. An electronic device, comprising:
a touch screen including a display area for displaying an image,
a window disposed above the touch screen, and
a controller,
wherein the touch screen comprises:
a touch sensing layer for receiving a touch input applied to the display area and receiving the touch input at a first sensing resolution;
a fingerprint sensing layer overlapping a specific area of the touch sensing layer and disposed between the window and the touch sensing layer, and configured to sense a fingerprint at a second sensing resolution, which is higher than the first sensing resolution, when a finger is touched on the specific area,
wherein the touch sensing layer includes a plurality of first and second sensing electrode lines arranged to intersect each other,
wherein the fingerprint sensing layer includes a plurality of first and second fingerprint sensing electrode lines arranged to intersect each other,
wherein the plurality of second sensing electrode lines and the plurality of second fingerprint sensing electrode lines extend in a same direction, and
wherein the plurality of second fingerprint sensing electrode lines include first electrode lines overlapping with one area of one second sensing electrode line, and second electrode lines not overlapping with the second sensing electrode line;
a first switch configured to connect the first electrode lines to a circuit board;
a second switch configured to connect one end of the second switch to the first electrode lines; and
a fourth switch configured to connect sensing electrode lines provided in the fingerprint sensing layer to the second circuit board,
wherein one end of the second switch is connected to a branched line from the fourth switch so the first electrode lines are grouped to operate as a single sensing line in the touch sensing mode,
wherein the controller controls the fingerprint sensing layer so that the second sensing resolution of the specific area is changed to the first sensing resolution in order to receive a touch input of a finger making contact with the specific area based on a specific control command, and
wherein the controller controls the first switch to be disconnected and the second switch to be connected based on the specific control command, so that the second sensing resolution of the specific area is changed to the first sensing resolution by the first electrode lines being grouped to operate as a single sensing line.

6. The electronic device of claim 5, further comprising:
a first circuit board connected to the plurality of first switches, and
a second circuit board connected to the plurality of second switches.

7. The electronic device of claim 6, wherein the plurality of first switches connects the first electrode lines to the first circuit board so that each of the first electrode lines acquires fingerprint information together with the first fingerprint sensing electrode lines.

8. The electronic device of claim 7, wherein the switch unit further comprises a third switch configured to disconnect the first sensing electrode lines from the second circuit board while the fingerprint information is being acquired.

9. The electronic device of claim 6, wherein the plurality of second switches connects the first electrode lines overlapping with the one area of the one second sensing electrode line to the second circuit board so that the first electrode lines operate as a single sensing line to receive a touch input together with the first sensing electrode line.

10. The electronic device of claim 9, wherein the switch unit further includes a fifth switch connected to the second fingerprint sensing electrode lines excluding the first electrode lines, and
wherein the controller controls the fifth switch such that the second electrode lines are disconnected from the first circuit board while the touch input is being received.

11. The electronic device of claim 5, wherein the plurality of second sensing electrode lines corresponds to Rx electrode lines.

12. The electronic device of claim 5, further comprising a cover glass that includes a connecting portion for transferring an electric field to the fingerprint sensing layer from the touch sensing layer, wherein the fingerprint sensing layer is disposed so as to overlap one area of the touch sensing layer, and the cover glass is formed between the touch sensing layer and the fingerprint sensing layer, and wherein the connecting portion includes a plurality of holes formed in a thickness direction of the cover glass and having a light-transmissive conductive member filled therein.

13. The electronic device of claim 12, wherein the connecting portion is formed in an area corresponding to part of the electrode lines of the fingerprint sensing layer extending in a same direction as the Rx electrode lines of the touch sensing layer.

14. The electronic device of claim 5, wherein the controller switches a mode to a fingerprint sensing mode for acquiring fingerprint information at the second sensing resolution from a touch sensing mode for receiving a touch input corresponding to a specific function at the first sensing resolution based on a specific control command, and wherein the controller acquires fingerprint information without executing the specific function when a touch is applied to the specific area in the fingerprint sensing mode.

15. The electronic device of claim 14, wherein the controller controls the touch sensing layer such that the touch input applied to a remaining area excluding the specific area of the touch screen is not received in the fingerprint sensing mode.

16. The electronic device of claim 14, wherein the specific control command corresponds to execution of a preset application in response to a touch input applied to the touch screen, and wherein the controller acquires fingerprint information through the fingerprint sensing layer when an execution screen of the application is displayed on the touch screen.

17. The electronic device of claim 14, wherein the controller executes a different function according to when the touch input is received and when the fingerprint information is acquired based on the touch applied to the touch screen.

* * * * *